United States Patent
Greene

[15] 3,699,915
[45] Oct. 24, 1972

[54] UNIFORMLY ILLUMINATED METER INDICATOR

[72] Inventor: William H. Greene, Pompano Beach, Fla.

[73] Assignee: The Bendix Corporation, Ft. Lauderdale, Fla.

[22] Filed: May 19, 1971

[21] Appl. No.: 144,946

[52] U.S. Cl. .............. 116/129 L, 73/431, 240/1 EL, 240/2.1
[51] Int. Cl. ................................. G01d 11/28
[58] Field of Search .............. 116/129, 129 L, 124.4; 240/1 EL, 2 B, 2 M, 2.1; 73/431; 324/115, 156; 40/130

[56] References Cited

UNITED STATES PATENTS

| 2,150,836 | 3/1939 | Lamb .................. 116/129 L |
| 2,413,848 | 1/1947 | Simpson .................. 116/129 L |
| 2,561,881 | 7/1951 | Oetting ............... 240/1 EL X |
| 2,837,052 | 6/1958 | Viret .......................... 116/129 |
| 2,837,053 | 6/1958 | Viret .......................... 116/129 |
| 2,953,668 | 9/1960 | Bassett, Jr. ........... 240/1 EL X |
| 3,257,748 | 6/1966 | Hardesty ..................... 40/130 |

Primary Examiner—Louis J. Capozi
Attorney—Bruce L. Lamb et al.

[57] ABSTRACT

A cup-shaped meter case made of a light conductive material has a light source mounted interior of the bottom surface thereof. The edge of the case is terminated in an inwardly directed, in cross-section generally triangular, rim. The edge of the case is additionally beveled on both the inner and outer surfaces to direct light conducted from the light source through the case side into the triangular rim from where it is dispersed both inwardly and outwardly of the case to illuminate a dial suitably located outwardly of the rim and to illuminate a meter plate and needle located inwardly of the rim. In one alternate embodiment the case side is shown separated from the case bottom so that the rim may be rotated with respect to the light source. In a further embodiment a separate dial plate is shown fitted over the rim and rotatable thereon.

4 Claims, 5 Drawing Figures

PATENTED OCT 24 1972

3,699,915

INVENTOR
WILLIAM H. GREENE

BY
William G. Christoforo
ATTORNEY

UNIFORMLY ILLUMINATED METER INDICATOR

BACKGROUND OF THE INVENTION

This invention relates to illuminated meters and more particularly to those meters whose faces including needles, meter plates and dials are required to be uniformly illuminated.

There has been a requirement that certain meters, particularly aircraft instrument meters, be uniformly illuminated over their entire face. This has been accomplished by specially formed, wedge-shaped meter windows which are edge-illuminated. This particular shape allows the light conductive through the window to be evenly dispersed upon the meter face. The special shape of the meter windows makes them particularly difficult and expensive to manufacture. Additionally, the light sources for edge illuminating the windows are normally located at the front panel in which the meter is mounted thus tending to contribute to a general cluttered appearance of the aircraft instrument panel.

SUMMARY OF THE INVENTION

The present invention provides a uniformly illuminated meter through the use of a cup-shaped meter case made of a light conductive material and which has a generally thickened bottom section in which a light source is mounted. Light is uniformly conducted throughout the interior of the meter case material. A specially shaped rim at the edge of the case intercepts the conducted light and disperses it outwardly of the rim to illuminate a dial situated in that vicinity and also inwardly into the bowl of the case to illuminate a suitably positioned meter plate and needle. A plain, transparent cover plate may now be used to cover and protect the meter face.

Other embodiments of the invention are shown which permit the case rim to be rotated with respect to the light source while preserving the uniform illumination of the meter face.

DESCRIPTION OF THE PREFERRED EMBODIMENT

Figure 1:
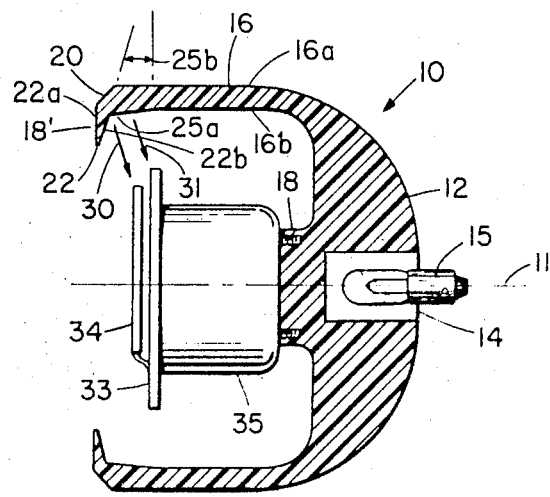
FIG. 1 is a partly sectional side view of a meter case illustrating the principles of the invention.

Referring to the figures wherein like reference numerals refer to like elements and referring particularly to FIG. 1 there is seen a meter case 10 made of a light conductive material, suitably plexiglas, in the form of a cup that is generally a volume of revolution. The meter case 10 includes a thickened bottom section 12 having an aperture 14 in which is inserted a light source, suitably a light bulb 15. Aperture 14 may optionally be centrally located, as shown, or offset. The case side 16 is suitably of a thinner material than the case bottom and terminates in an edge 18. The edge is finished in a beveled surface 20 at its outer end. Projecting inwardly from the edge is a rim 22 which is seen to be generally triangular in its cross-section. The outside surface 22a of the rim is generally perpendicular to the longitudinal axis 11 of the meter case. The inner surface 22b of the rim is inclined at a shallow angle from surface 22a. The surfaces 16a and 16b of side 16 are generally parallel to the longitudinal axis of the case. However, the inner surface of case side 16 in the vicinity of rim 22, that is at the surface designated 25a, is directed inwardly so that perpendiculars taken from the surface, for example, perpendicular arrows 30 and 31 are directed at meter card 33 and needle 34 of meter mechanism 35 which is mounted on a boss 18 inside the case. Thus, light moving through side 16 is reflected against beveled surface 20 into the triangular shaped rim 22 and onto surface 25a from whence it is dispersed through that surface onto the meter face comprised of meter card 33 and needle 34. Additionally, a portion of the light is reflected at inner surface 22b and dispersed through outside surface 22a.

Figure 5:
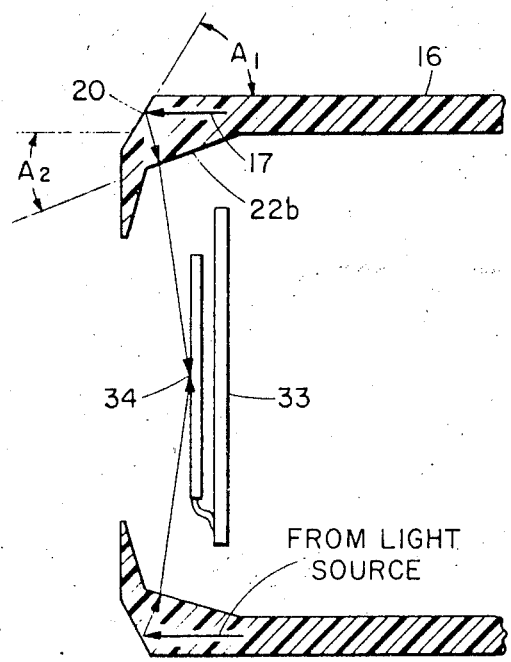
FIG. 5 shows in greater detail the shape of the meter case rim and its effect upon the light path.

Reference should now be made to FIG. 5 which shows the meter case edge in greater detail and its effect upon the light path. As shown, beveled surface 20 is at an angle $A_1$ with respect to side 16 while inner surface 22b is inclined at an angle of $A_2$ to side 16. Light is conducted through the meter case material generally along paths parallel to arrow 17 to reflect against beveled surface 20 to be transmitted through inner surface 22b. Knowing the refracture index of the meter case material, $A_1$ and $A_2$ can be chosen such that the light transmitted through inner surface 22b is directed at or near the center needle 34 and meter card 33.

Figure 2:
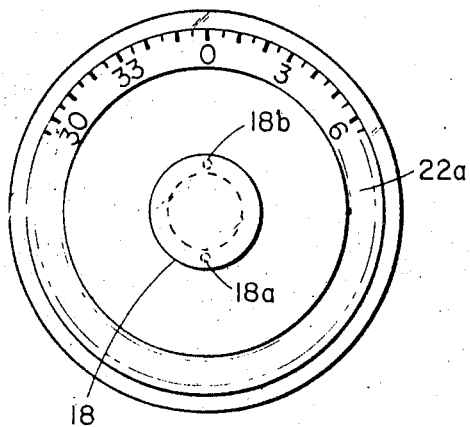
FIG. 2 is a front view of the meter case of FIG. 1 but with the meter movement removed.

Referring now to FIG. 2 which is a front view of the meter case of FIG. 1 with meter mechanism 35 removed, there is seen indicia on rim surface 22a. This indicia might be dark to show against the lighted rim background or even more suitably might be frosted so as to show lighted on a dark background. Boss 18 is seen to have two suitable holes 18a and 18b for mounting meter mechanism 35.

Figure 3:
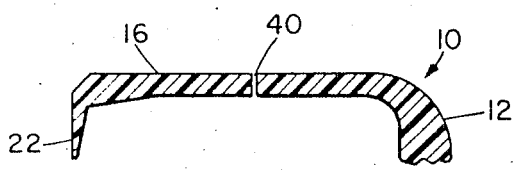
FIG. 3 is a partial view illustrating an alternate embodiment of the invention wherein the case side is split transversely from the cup bottom.

Refer now to FIG. 3 where the invention is embodied in a form which permits the rotation of rim 22 about the longitudinal axis of the meter without rotating the light source. It can be seen that side 16 has been cut along a plane perpendicular to the longitudinal axis of the meter to form a discontinuity 40 in the side. It can be seen that the sides of the discontinuity are parallel to one another and are suitably polished for maximum light transference thereacross. Light will now be conducted from bottom section 12 across discontinuity 40 and into side 16. The means by which the meter face is illuminated are identical to those described earlier.

Figure 4:
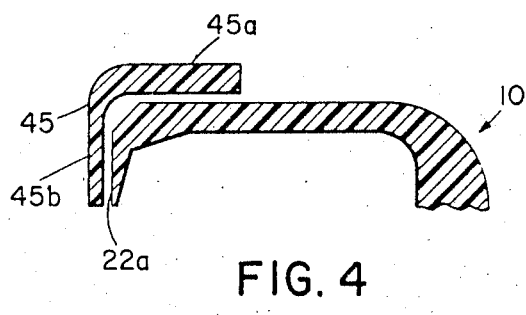
FIG. 4 shows another embodiment of the invention, in partial section, wherein a separate rim is provided over the case rim, rotatable thereon and illuminated thereby.

Referring now to FIG. 4 where meter case 10 is essentially identical to the meter case 10 of FIG. 1 and where additionally a ring dial 45 having a dial face 45b generally parallel to rim surface 22a and a turned-down section 45a generally perpendicular to surface 45b, and which turned-down section encircles the meter case 10 so as to be rotatable about the meter case longitudinal axis. In this embodiment the illumination of the meter plate and needle as shown in FIG. 1 is identical to that described in that figure. However, in FIG. 4 indicia are placed on surface 45b so that light dispersed through surface 22a illuminates that indicia.

The invention claimed is:

1. A cup-shaped case made of a light conductive material comprising:
    a first section having light receiving means located therein;
    a side portion having exterior and interior surfaces and terminating in an end surface, the intersection of said end surface with said exterior surface being beveled; and,
    an inwardly directed annular rim section having an outer face generally co-extensive with said end surface and an innerface forming a shallow angle with said outer face and forming an intersection with said side portion interior surface, said side portion in the vicinity of said intersection being inwardly directed at a shallow angle with respect to the interior surface of said side portion generally.

2. The cup-shaped case of claim 1 with additionally indicia placed on said end surface.

3. The cup-shaped case of claim 1 with additionally an annular discontinuity in said case generally perpendicular o the light conductive paths in said material.

4. The cup-shaped case of claim 3 with additionally indicia placed on said end surface.

* * * * *